(12) United States Patent
Chalasani et al.

(10) Patent No.: US 6,187,474 B1
(45) Date of Patent: Feb. 13, 2001

(54) BATTERY CONTAINER

(75) Inventors: Subhas C. Chalasani, Plano; Mathew Joseph, Mesquite; Roy Kuipers, Rockwall, all of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/244,555

(22) Filed: Feb. 3, 1999

(51) Int. Cl.$^7$ .................................................... H01M 2/10
(52) U.S. Cl. ............................ 429/187; 429/176; 429/163
(58) Field of Search .................................... 429/163, 176, 429/186, 187, 100

(56) References Cited

U.S. PATENT DOCUMENTS

| | | | |
|---|---|---|---|
| 842,950 | * | 2/1907 | Gernsback . |
| 4,042,762 | * | 8/1977 | Hakarine ............................... 429/187 |
| 4,374,188 | * | 2/1983 | Campbell et al. ..................... 429/187 |
| 4,861,687 | * | 8/1989 | Brantley et al. ...................... 429/187 |
| 5,415,956 | * | 5/1995 | Ching .................................... 429/187 |
| 5,565,283 | | 10/1996 | Chalasani et al. ..................... 429/187 |

* cited by examiner

Primary Examiner—Maria Nuzzolillo
Assistant Examiner—Tracy Dove

(57) ABSTRACT

The present invention provides, in one embodiment, a battery container. In this particular embodiment, the container comprises a housing having side walls and a spacing ridge formed in and extending outwardly from the side walls. The spacing ridge forms a groove on an interior surface of the walls and has a slot formed in the spacing ridge at first and second opposing ends of the housing. In an alternate embodiment, the spacing ridge has a plurality of slots formed on opposing ends of the container. Typically, two adjacent slots are formed on each end such that opposing ends of the handle may engage the retaining pin through the slots. The container further comprises a handle and a retaining pin configured to be received within the interior groove adjacent the slot. The handle is cooperatively engageable with the retaining pin to provide a lifting point for the container when the retaining pin is received in the interior groove. The handle and the retaining pin work cooperatively together to provide a handle that can easily be removed from the container, if so desired.

20 Claims, 4 Drawing Sheets

BATTERY CONTAINER

TECHNICAL FIELD OF THE INVENTION

The present invention is directed, in general, to a battery container and, more specifically, to a battery container having a handle for lifting the container and a battery received within the container.

BACKGROUND OF THE INVENTION

In our complex society today, numerous systems rely upon electrical power to function properly. Under normal circumstances, operating power is provided by the commercial AC power distribution systems for heat, air conditioning, traffic lights, cooking, telecommunications, etc. Since many, if not all, major power distribution lines are located on poles or towers, a natural disaster, such as a tornado, hurricane, or blizzard, frequently causes the loss of commercial AC power. The failure of commercial AC power may constitute a significant danger to life or property depending upon the system impacted. For instance, failure of AC power supplying the lighting or air conditioning in a hospital or nursing home could readily result in loss of life. Therefore, backup power systems have been developed to assure that the loss of primary power does not seriously affect critical systems.

The one critical system which is most often taken for granted is the telecommunications system. Significantly, when an emergency occurs, virtually everyone expects that telephone communications will remain unaffected. Clearly this is essential; since it is through the telephone that we normally summon medical or rescue aid. Therefore, because of this essential nature, the telecommunications system has been provided with a complex backup power system in the event of commercial AC power failure.

Traditionally, backup electricity for telecommunications has been achieved by dispersing batteries throughout the telecommunications system to power the necessary switches, amplifiers, etc., of the system. These batteries, amounting to millions worldwide, may be located in special rooms, atop a telephone pole, or even atop a mountain, depending upon the local system needs. These batteries may be in place for years before a power failure requires them. These batteries, which are typically a lead-acid type, employ a very well understood and proven technology. However, the batteries still require physical maintenance from time to time, eventually do fail, and must be replaced. Because of the nature of the components, the batteries are inherently extremely heavy per unit volume. Some of the portable batteries used in telecommunications backup weigh as much as 120 pounds each. Additionally, the lead is very toxic and, when no longer useable, must be properly recycled. The acid electrolyte is also a significant hazard to those who must service the batteries, or to anyone who comes in contact with them. Therefore, handling the batteries must be as safe as possible with little chance of an accident. Dropping a battery could cause a very undesirable chemical spill, and cause possible injury to the technician.

Typically, telecommunications backup batteries are located within a steel case, with handles at opposing ends. However, as in many areas, an emphasis on optimal use of space drives a requirement to make the batteries and their cases as small as possible. Unfortunately, the batteries have been optimized to such an extent that the emphasis on space savings has shifted to the case. As the battery case is relatively thin steel, little can be done to reduce case size.

One area of the case that has only infrequent, although important, usage is the handle used for lifting. Whatever material is used for the handle, it must be: (a) resistant to the acid electrolyte in the batteries, (b) fire resistant, or at least not support combustion, and (c) of sufficient strength to support the battery weight. Previous handles have comprised metal, plastic, and synthetic cloth. Metal handles, although meeting all of the above criteria, are somewhat bulky, and thus do not help solve the space problem. Metal handles also will conduct electricity, and therefore pose something of an electrical shorting problem. Some plastics meet (b) and (c) above, but are not resistant to the acid. Most synthetic cloths, such as KEVLAR® and NOMEX® are also not acid resistant. The one material found to meet all of the above criteria is a fiber made of RYTON™ (polyphenylene sulfide—PPS). PPS has been successfully used for battery handles of the type described in U.S. Pat. No. 5,565,283 to Chalasani et al, However, the design of Chalasani requires a significant amount of PPS, which is quite expensive. Therefore, it would be highly desirable to produce a design which uses significantly less material for each handle.

Accordingly, what is needed in the art is a battery handle that is both fire and acid resistant, has a minimal profile, and is cheaper to manufacture than the current design.

SUMMARY OF THE INVENTION

To address the above-discussed deficiencies of the prior art, the present invention provides, in one embodiment a battery container. In this particular embodiment, the container comprises a housing having sidewalls and a spacing ridge formed in and extending outwardly from the side walls. The spacing ridge forms a groove on an interior surface of the walls and has a slot formed in the spacing ridge at first and second opposing ends of the housing. In an alternate embodiment, the spacing ridge has a plurality of slots formed on opposing ends of the container. Typically, two adjacent slots are formed on each end such that opposing ends of the handle may engage the retaining pin through the slots. The container further comprises a handle and a retaining pin configured to be received within the interior groove adjacent the slot. The handle is cooperatively engageable with the retaining pin to provide a lifting point for the container when the retaining pin is received in the interior groove. The handle and the retaining pin work cooperatively together to provide a handle assembly that can easily be removed from the container, if so desired. It should be specifically understood that it is within the broad scope of the present invention that the handle may be removable from the container, if so desired, by removing or detaching it from the retaining pin.

When the handle is cooperatively engaged with the retaining pin, both the retaining pin and handle are held in place with respect to the container. However, in an alternative embodiment, the container is configured to receive a battery therein such that the battery secures the retaining pin in the interior groove in the event that the handle is removed.

In another embodiment, the container further comprises a battery connector having battery contacts formed thereon. In yet another embodiment, the container may be configured (i.e., designed or formed) to be received in an equipment bay frame for a power system.

In another embodiment, the handle comprises a material having a securing end configured to extend through the slot and cooperatively engage and secure the handle to the retaining pin and a grasping end. The grasping end, of course, extends outwardly from the container to provide a user with a grasping surface so that the container may be lifted. In an advantageous embodiment, the container will have handles attached to the opposing ends of the container. The material should have a tensile strength sufficient to lift the container and a battery contained within the container. In another aspect of this particular embodiment, the material is a flexible strap having opposing ends that are securable to the strap to form opposing loops. In an alternative embodiment, the material comprises a metallic material having a securing end configured to extend through the slot and cooperatively engage and secure the handle to the retaining pin.

In another embodiment, the spacing ridge includes a first slot positioned adjacent a second slot and the handle comprises a material having a first end configured to extend through the first slot and a second end configured to extend through the second slot. The first and second ends are configured to cooperatively engage and secure the handle to the retaining pin. Again, the material has a tensile strength sufficient to lift the container and a battery received within the container. In one embodiment, the material is a flexible strap, and in an alternative embodiment, the material comprises a metallic material.

The foregoing has outlined, rather broadly, preferred and alternative features of the present invention so that those who are skilled in the art may better understand the detailed description of the invention that follows. Additional features of the invention will be described hereinafter that form the subject of the claims of the invention. Those who are skilled in the art should appreciate that they can readily use the disclosed conception and specific embodiment as a basis for designing or modifying other structures for carrying out the same purposes of the present invention. Those who are skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
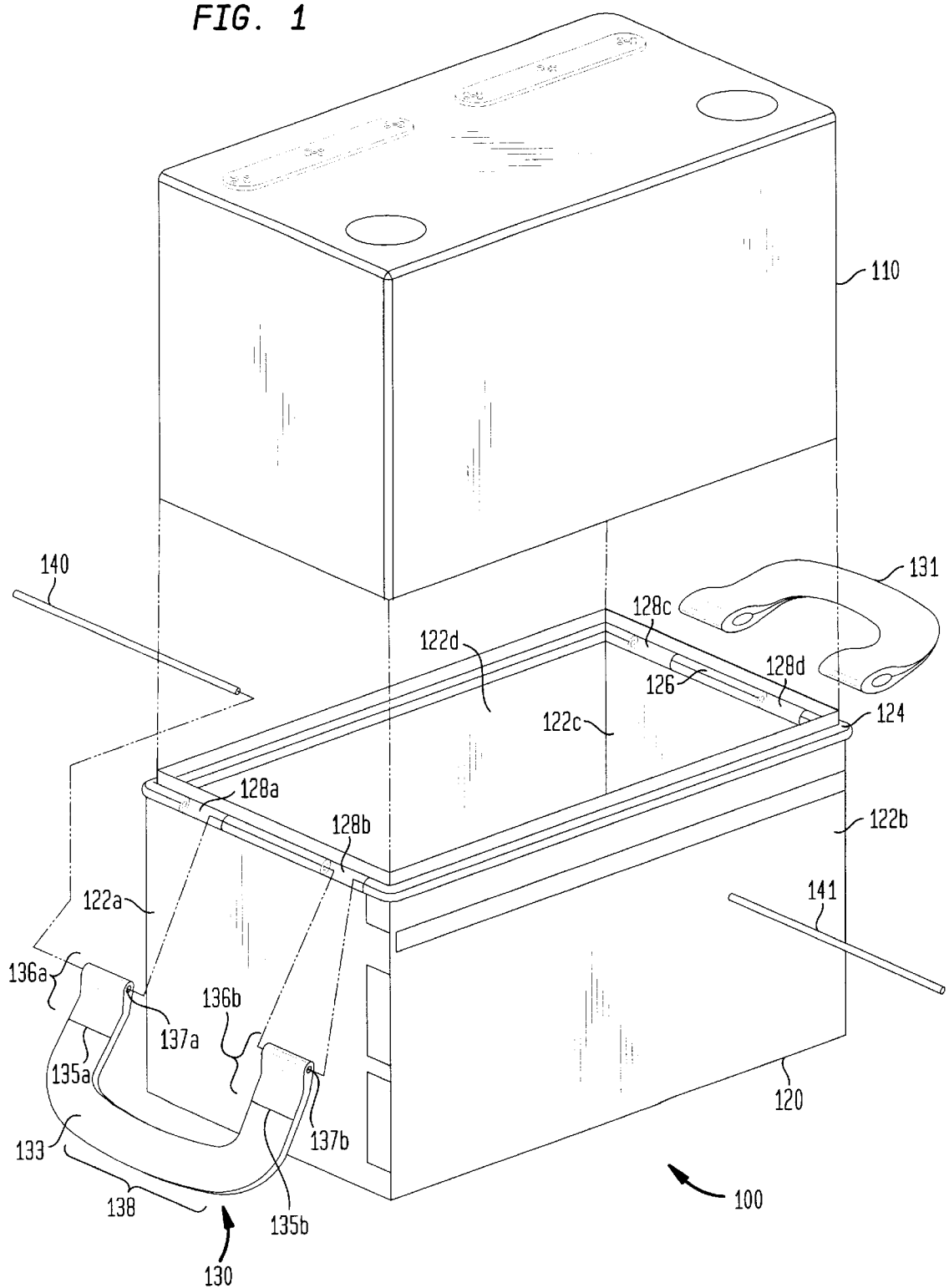
FIG. 1 illustrates an exploded isometric view of one embodiment of a battery assembly constructed according to the principles of the present invention.

Referring initially to FIG. 1, illustrated is an exploded isometric view of one embodiment of a battery assembly constructed according to the principles of the present invention. A battery assembly, generally designated 100 and having a substantially parallelepiped shape, comprises a battery 110, a battery housing 120, a plurality of handles 130, 131, and a plurality of retaining pins 140, 141. The battery 110 comprises a conventional lead-acid battery, typically of 12 volts DC. The housing 120 comprises four sidewalls, collectively designated 122 or individually 122a–122d, and a bottom (not visible) formed of suitable material, most commonly steel. Opposing sidewalls 122a and 122c may also be termed first and second opposing ends. Formed in and extending outwardly from the sidewalls 122 is an essentially horizontal, spacing ridge 124 that assures adjacent battery assemblies 100 are appropriately separated for cooling. When the spacing ridge 124 is formed, a groove 126 results in the interior face of the sidewalls 122. In the illustrated embodiment, the opposing ends 122a and 122c each have a plurality of slots 128a, 128b, and 128c, 128d, respectively, formed in the spacing ridge 124.

In the illustrated embodiment, the handles 130, 131 may comprise webbed straps 133 of RYTON™ (polyphenylene sulfide—PPS). RYTON™ has significant tensile strength, very low electrical conductivity, a high resistance to flame, which meets or exceeds the requirements of UL94V-O, as well as a high resistance to acid at elevated temperature. RYTON™ is advantageously resistant or inert with respect to sulfuric acid, which is a major consideration in a battery transport handle. Other materials of similar strength, electrical and durability characteristics may alternatively be used for this application. In alternative embodiments of the handle, an extruded ribbon or other material, not comprising webbed material, may be used as the handle to supply the hand grip. In the illustrated embodiment, the handle 130 may be formed by contortuplicating opposing ends 135a, 135b of the webbed strap 133, forming two securing ends 136a, 136b with apertures 137a, 137b, respectively. Joining may be by sewing, ultrasonic bonding, or by both in combination. The remaining handle 131 may be formed in a similar manner. In an alternate embodiment, the handle 131 may be formed of metallic material or hard plastic wherein the handle 131 has a first end that is configured to engage the retaining pin 140 and a second end that is configured to be grasped by a user such that the container may be lifted. One such alternate embodiment may be similar to a hook, as generally described below. In such embodiments, the hook may have a handle for the second end and a hook end that is configured to catch the retaining pin 140 to provide a lifting point. This particular configuration provide a handle that is easily removable from the container 120. Thus, in one application, the user may have a pair of such handles that can be used to engage the retaining pins and lift the container 120.

In one embodiment, the retaining pins 140, 141 comprise a plurality of straight metal rods, preferably of stainless steel. The retaining pins 140, 141 are configured to be received within the interior groove 126 adjacent the slots 128a, 128b and 128c, 128d, respectively. To assemble the handle 130 to the container 120, the securing ends 136a, 136b are passed from the outside of the container 120 through the slots 128a, 128b, respectively, a sufficient distance to permit the retaining pin 140 to be threaded through apertures 137a and 137b. A pulling force is applied to a grasping end 138 of the handle 130 so that the securing ends 136a, 136b are pulled outwardly until restrained by the retaining pin 140 that is seated in the groove 126. The remaining handle 131 is similarly installed in the opposing end 122c through slots 128c and 128d and retained by the retaining pin 141. When the battery 110 is inserted into the container 120, the retaining pins 140, 141 are captured in the interior groove 126 between the battery 110 and the groove 126. With the retaining pins 140, 141 in the interior groove 126, the handles 130, 131 cooperatively engage the retaining pins 140, 141 and the interior groove 126 to provide lifting points for the container 120. In this embodiment, the amount of PPS used per container is approximately one-half that used in Chalasani et al, resulting in a significant cost savings and simplifying assembly.

Figure 2:
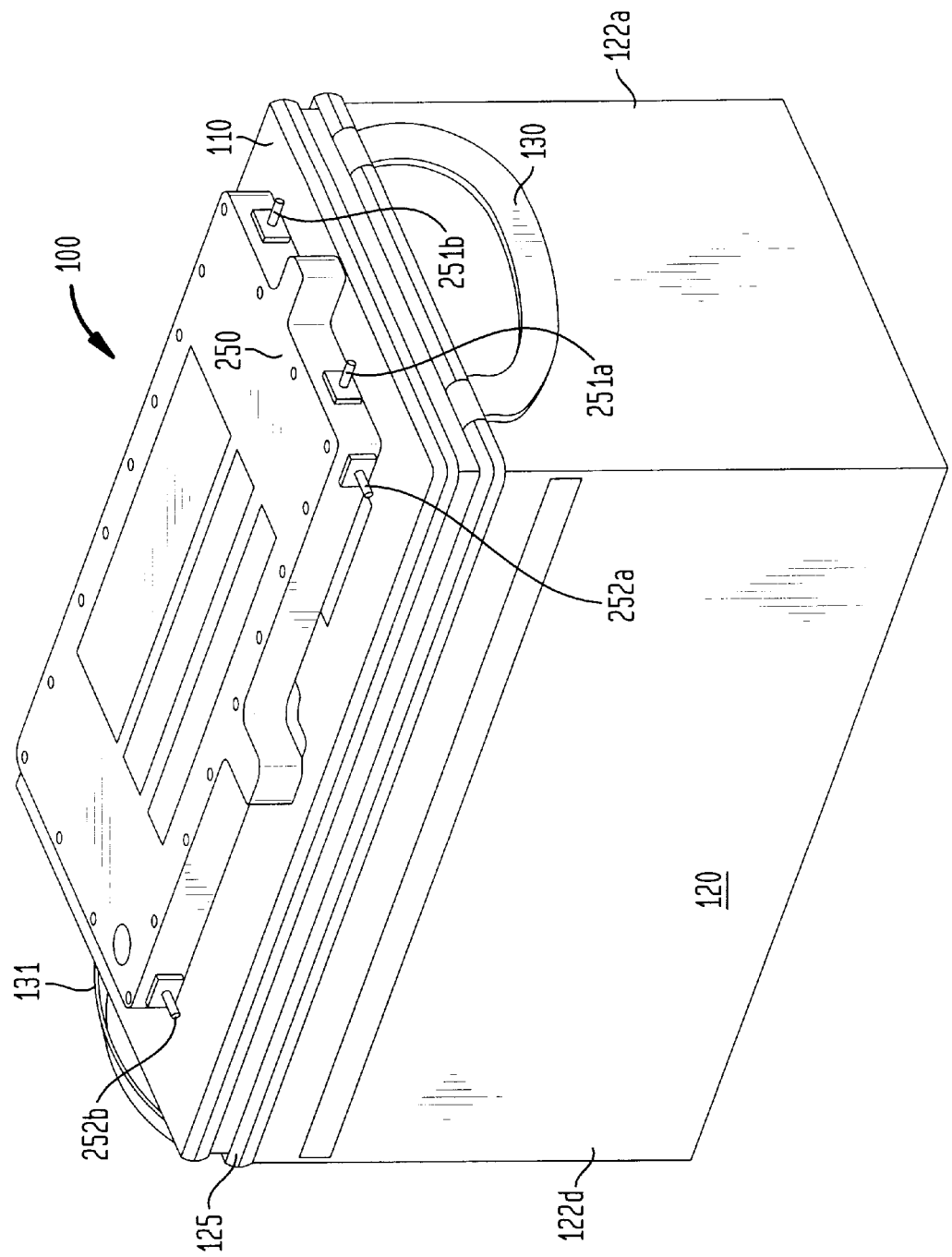
FIG. 2 illustrates an isometric view of the completed battery assembly of FIG. 1.

Referring now to FIG. 2, illustrated is an isometric view of the completed battery assembly of FIG. 1. In the illustrated embodiment, the battery 110 has been installed into the container 120 and a battery connector 250 has been attached to the battery 110. The battery connector 250 provides pairs of electrical cable attach points 251a–251b or 252a–252b for interconnection to a power system (not shown). One pair of cable attach points, either 251a–251b or 252a–252b, are used depending upon the orientation of the battery within an equipment bay frame to be described below.

Figure 3:
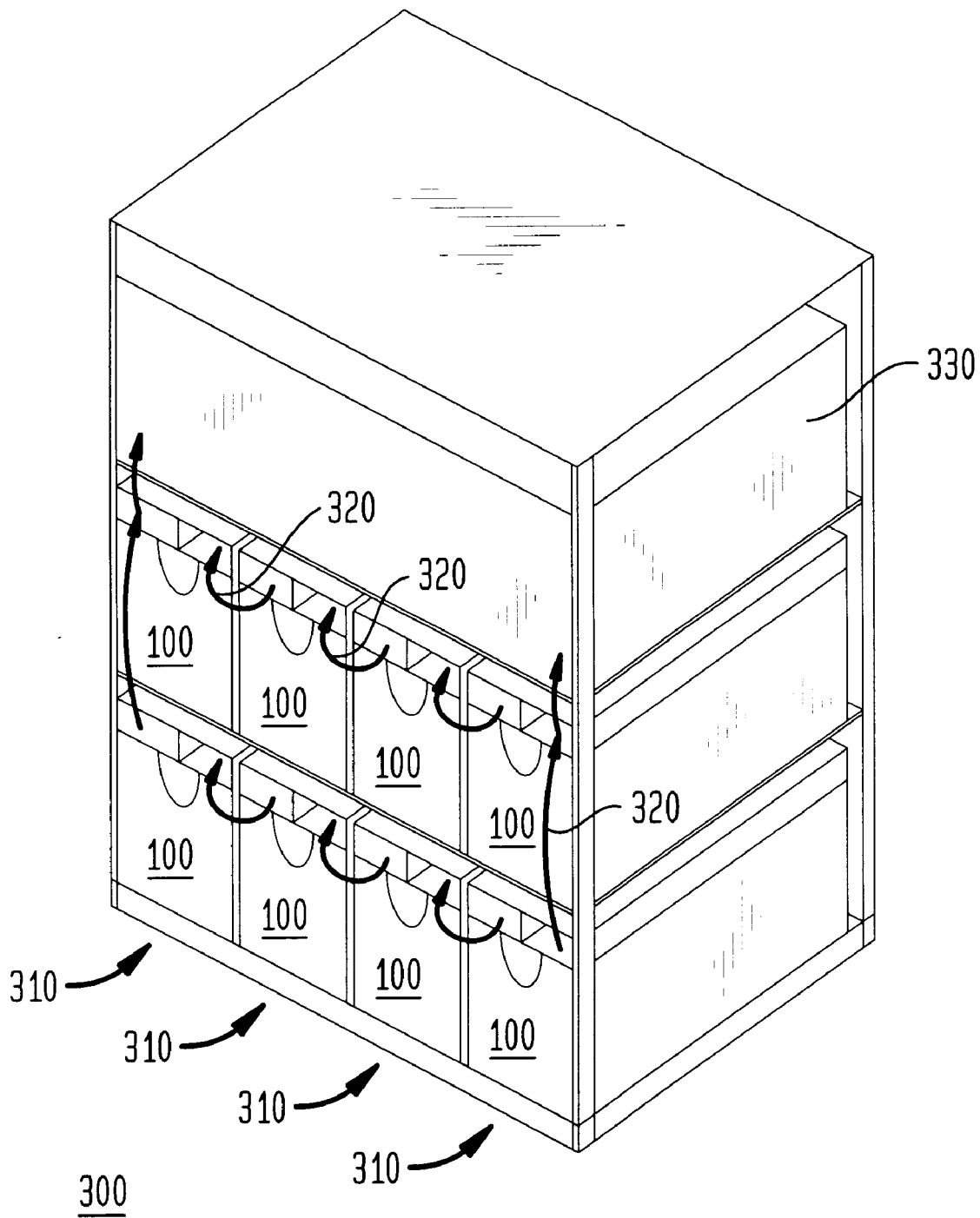
FIG. 3 illustrates an isometric view of an equipment bay frame for a power system with a plurality of the battery assemblies of FIG. 1 installed.

Referring now to FIG. 3, illustrated is an isometric view of an equipment bay frame for a power system with a plurality of the battery assemblies of FIG. 1 installed. An equipment bay frame, generally designated 300, comprises a plurality of locations 310 designed to receive and support a corresponding plurality of battery assemblies 100. By appropriate interconnection 320 of the battery assemblies 100, an appropriate voltage, most commonly 24 volts DC or 48 volts DC, may be obtained. One who is skilled in the art will recognize that all, or any appropriate number, of the plurality of locations 310 may be used as dictated by the backup sower requirements. The equipment bay frame 300 further comprises a transformer/rectifier system 330 that converts commercial AC power to the appropriate DC voltage. The DC voltage is then available to power a telecommunications or other power system, or maintain the batteries at a proper state of charge. One who is skilled in the art is familiar with battery charging systems.

Figure 4:
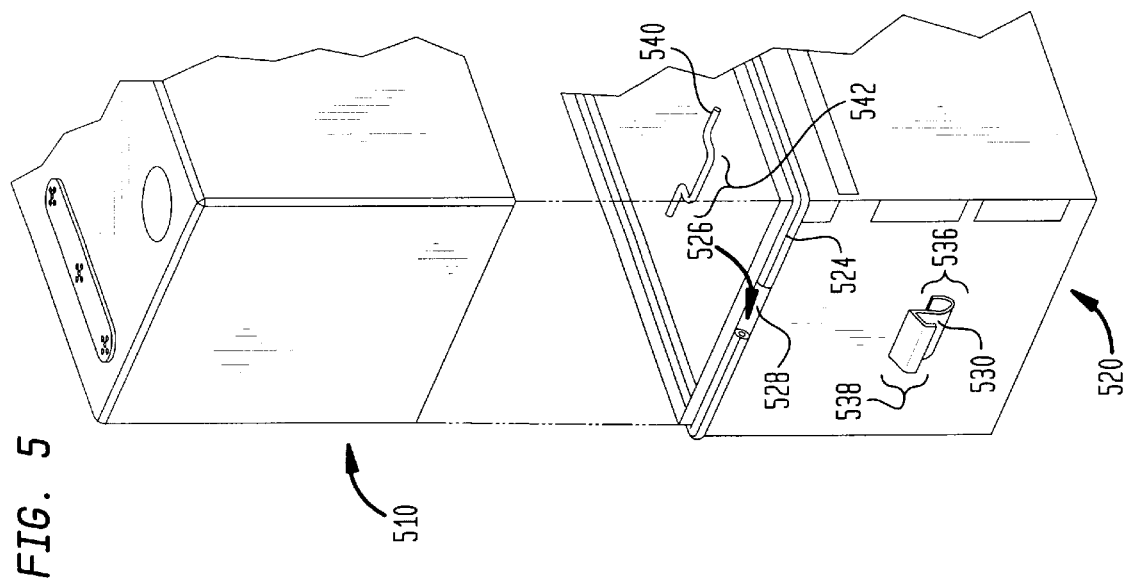
FIG. 4 illustrates a partial, exploded end view of one alternative embodiment of the container of FIG. 1.

Referring now to FIG. 4, illustrated is a partial, exploded end view of one alternative embodiment of the container of FIG. 1. In the illustrated embodiment, a handle 430 comprises a strap 433 of RYTON™ formed to a double loop having a securing end 436 and a grasping end 438. Loops 436, 438 may be formed in the same manner as the securing ends 136a, 136b of FIG. 1. The handle 430 is installed in a manner analogous to the handle 130 of FIG. 1. The handle 430 is assembled to a container 420 by passing the securing end 436 from the outside of the container 420 through a slot 428 a sufficient distance to permit a retaining pin 440 to be threaded through aperture 437. A pulling force is applied to the grasping end 438 of the handle 430 so that the securing end 436 is pulled outwardly until restrained by a retaining pin 440 seating in a groove 426. When a battery 410 is inserted into the container 420, the retaining pin 440 and securing end 436 is captured in the interior groove 426 between the battery 410 and the groove 426.

Figure 5:
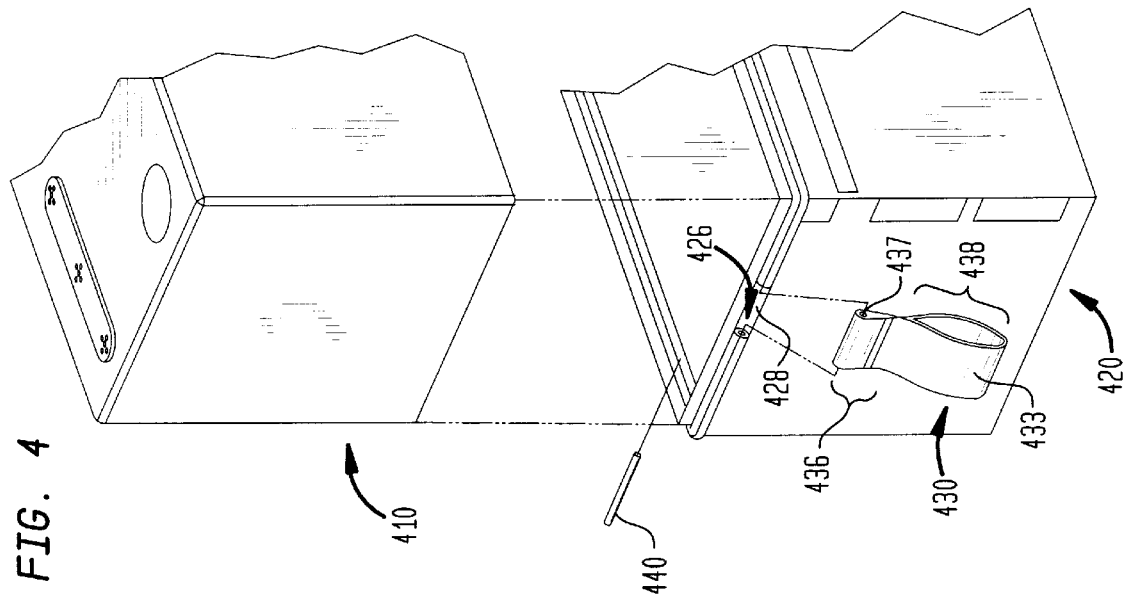
FIG. 5 illustrates a partial, exploded end view of an alternative embodiment of the container of FIG. 4.

Referring now to FIG. 5, illustrated is a partial, exploded end view of an alternative embodiment of the container of FIG. 4. In the illustrated embodiment, a projection 542 in a retaining pin 540 is passed from the inside of a container 520 through a slot 528 in a spacing ridge 524. The retaining pin 540 is held in a groove 526 by a battery 510. A removable handle 530 comprises a rigid grip of metal, or other suitable material, having an unciform securing end 536 and a grasping end 538 suitably shaped for a hand to lift the combined weight of the container 520 and a battery 510. The projection 542 extends only minimally from the container 520 to allow the temporary engagement of the securing end 536 of the handle 530. In an alternative embodiment, a plurality of projections 542 may be formed in the retaining pin 540 to correspond to a plurality of slots 528 formed in the spacing ridge 524. The plurality of projections 542 likewise correspond to a plurality of crampon-shaped appendages on the handle 530.

From the foregoing it is readily apparent that the present invention provides, in one embodiment, a battery container that comprises a housing with a spacing ridge formed in and extending outwardly from the side walls, a handle and a retaining pin configured to be received within the interior groove adjacent the slot. The handle is cooperatively engageable with the retaining pin to provide a lifting point for the container when the retaining pin is received in the interior groove. The handle and the retaining pin work cooperatively together to provide a handle that can easily be removed from the container, if so desired.

Although the present invention has been described in detail, those who are skilled in the art should understand that they can make various changes, substitutions and alterations herein without departing from the spirit and scope of the invention in its broadest form.

What is claimed is:

1. A battery container, comprising:
   a housing having side walls and a spacing ridge formed in and extending outwardly from said side walls, said spacing ridge forming a groove on an interior surface of said walls and having a slot formed therein at first and second opposing ends of said housing;
   a handle; and
   a retaining pin configured to be received within said interior groove adjacent said slot, said handle cooperatively engageable with said retaining pin to provide a lifting point for said container when said retaining pin is received in said interior groove.

2. The container as recited in claim 1 wherein said container is configured to receive a battery therein such that said battery secures said retaining pin in said interior groove.

3. The container as recited in claim 1 wherein said spacing ridge includes a plurality of said slots on said first and second opposing ends, said container further includes a pair of said handles that are attachable to each of said first and second opposing ends.

4. The container as recited in claim 1 further comprising a battery connector having battery contacts formed thereon.

5. The container as recited in claim 1 wherein said container is configured to be received in an equipment bay frame for a power system.

6. The container as recited in claim 1 wherein said handle is comprised of a material having a securing end and a grasping end, said securing end configured to extend through said slot and cooperatively engage and secure said handle to said retaining pin, said material having sufficient tensile strength to lift said container and a battery contained therein.

7. The container as recited in claim 6 wherein said material is a flexible strap having opposing ends that are securable to said strap to form opposing loops.

8. The container as recited in claim 6 wherein said material is comprised of a metallic material having a securing end configured to cooperatively engage and secure said handle to said retaining pin.

9. The container as recited in claim 1 wherein said spacing ridge includes a first slot positioned adjacent a second slot and said handle is comprised of a material having a first end configured to extend through said first slot and a second end configured to extend through said second slot, said first and second ends configured to cooperatively engage and secure said handle to said retaining pin, said material having a tensile strength sufficient to lift said container and a battery contained therein.

10. The container as recited in claim 9 wherein said material is a flexible strap.

11. The container as recited in claim 9 wherein said material is comprised of a metallic or plastic material.

12. A method of manufacturing a battery container, comprising:

forming a housing having side walls;

forming a spacing ridge in said side walls, said spacing ridge extending outwardly from said walls and forming a groove on an interior surface of said walls;

forming a slot in said spacing ridge at first and second opposing ends of said housing;

attaching a handle to a retaining pin configured to be received within said interior groove adjacent said slot, said handle cooperatively engaging said retaining pin to provide a lifting point for said container when said retaining pin is received in said interior groove.

13. The method as recited in claim 12 further comprising placing a battery in said container such that said battery secures said retaining pin in said interior groove.

14. The method as recited in claim 12 wherein forming a slot further comprises forming a plurality of said slots on said first and second opposing ends and attaching a handle includes attaching a handle to each of said first and second opposing ends.

15. The method as recited in claim 12 further comprising forming a battery connector having battery contacts formed on said container.

16. The method as recited in claim 12 wherein forming a housing includes forming said housing such that it may be received in an equipment bay frame for a power system.

17. The method as recited in claim 12 wherein attaching a handle includes extending a securing end of said handle through said slot and cooperatively engaging said securing end to said retaining pin, said handle having a grasping end and comprised of a material having a tensile strength sufficient to lift said container and a battery contained therein.

18. The method as recited in claim 17 wherein said material is a flexible strap having opposing ends that are securable to said strap to form opposing loops.

19. The method as recited in claim 17 wherein said material is comprised of a metallic material having a securing end configured to cooperatively engage and secure said handle to said retaining pin.

20. The method as recited in claim 12 wherein forming a slot includes forming a first slot and a second slot adjacent said first slot; and attaching a handle includes extending a first end of said handle through said first slot and securing said first end to said retaining pin and extending a second end of said handle through said second slot and securing said second end to said retaining pin, said handle comprised of a material having sufficient tensile strength to lift said container and a battery contained therein.

* * * * *